United States Patent
Lim

(12) 
(10) Patent No.: US 6,693,861 B1
(45) Date of Patent: Feb. 17, 2004

(54) METHOD AND APPARATUS FOR SERVO CONTROL USING STEPPING MOTOR AS SLED MOTOR

(75) Inventor: Jae Cheol Lim, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/488,551

(22) Filed: Jan. 21, 2000

(30) Foreign Application Priority Data

Jan. 23, 1999 (KR) .......................................... 1999-2117

(51) Int. Cl.[7] ................................................. G11B 7/08
(52) U.S. Cl. ................................ 369/44.28; 369/44.32; 369/53.28
(58) Field of Search ........................... 369/44.28, 44.25, 369/44.32, 53.28

(56) References Cited

U.S. PATENT DOCUMENTS

| | | | |
|---|---|---|---|
| 5,084,661 A | | 1/1992 | Tanaka |
| 5,175,716 A | * | 12/1992 | Min ........................ 369/44.11 |
| 5,519,465 A | * | 5/1996 | Kawamura et al. .... 354/195.12 |
| 5,717,666 A | * | 2/1998 | Park ........................ 369/44.11 |
| 5,828,637 A | * | 10/1998 | Kim ........................ 369/44.28 |
| 6,118,747 A | * | 9/2000 | Van Rosmalen ............ 369/112 |

FOREIGN PATENT DOCUMENTS

| | | |
|---|---|---|
| EP | 0848376 | 6/1988 |
| JP | 63129532 | 10/1988 |

* cited by examiner

*Primary Examiner*—Gautam R. Patel
(74) *Attorney, Agent, or Firm*—Birch, Stewart, Kolasch & Birch, LLP

(57) ABSTRACT

A method and apparatus for control of a feed motor for an optical disk reproducing/recording device. If the center of an objective lens deviates from the optical axis beyond a predetermined level, a stepping motor driven by digital pulses moves the optical pickup so that the deviation decreases. Since the stepping motor is precisely controllable by the drive pulses, stable tracking capability is attainable even in the case where operating environment such as temperature changes. The method in accordance with the present invention comprises the steps of detecting the distance between the center of an objective lens and an optical axis, checking whether the detected distance exceeds a prescribed range, and changing the magnitude of each drive signal by a microstep depending upon the check result and applying the drive signals to a sled motor for moving an optical pickup containing the objective lens.

8 Claims, 5 Drawing Sheets

Conventional Art direction of optical pickup movement

METHOD AND APPARATUS FOR SERVO CONTROL USING STEPPING MOTOR AS SLED MOTOR

BACKGROUND OF THE INVENTION

1. Field of the Invention

The present invention relates to a method for servo control of an optical disk reproducing/recording device, and more particularly to a method for control of a feed motor for an optical disk reproducing/recording device.

2. Description of the Related Art

Shown in FIG. 1 is a general optical disk reproducing device, comprising an optical pickup 2 for reproducing recorded signals from an optical disk 1, an R/F unit 3 for outputting servo error signals and binary signals through combining signals reproduced from the optical disk 1 by the optical pickup 2, a synchronization unit 7 for creating a clock signal synchronized with the binary data outputted from the R/F unit 3, a digital signal processing unit 4 for processing the binary data stream received from the R/F unit 3 to retrieve digital data using the synchronization clock, a sled motor 11 for moving the optical pickup 2 in the radial direction, a spindle motor 12 for rotating the optical disk 1, a driver 8 for driving the sled motor 11 and the spindle motor 12, a servo unit 6 for providing control input to the driver 8, and a microcomputer 9 for supervising overall operation of the servo unit 6 and the digital signal processing unit 4.

Once the optical disk 1 is inserted into a disk tray, which is a part of the optical disk reproducing device mechanism, the optical disk 1 is clamped by a clamping device. Then, controlled by the servo unit 6, the drive 8 provides the spindle motor 12 with electric current, thereby rotating the optical disk 1. Provided with DC voltage by the drive 8, the sled motor 11 moves the optical pickup 2 a predetermined initial position.

To reproduce signals recorded on the optical disk 1, the optical pickup 2 with a laser diode and photo diodes installed in it, forms a laser beam spot on the recording layer of the optical disk 1 by irradiating a laser beam from the laser diode. The laser beam reflected from the optical disk 1 is collected by the photo diodes and converted into electric signals. A tracking error signal is generated from a combination of the electric signals in the R/F unit 3. Using the tracking error signal, the servo unit 6 creates tracking control input to make the laser beam spot follow a target track. The control input is applied to the driver 8 that provides electric current for the tracking actuator which moves an objective lens.

As the tracking actuator moves the objective lens in the radial direction, the center of the objective lens begins to deviate from the optical axis, which creates offset voltage in the tracking error. Therefore, a low-pass filtered tracking error signal indicates the distance between the center of the objective lens and the optical axis. The sled motor 11 is controlled to move the optical pickup 2 in such a way that the magnitude of the center error decreases if the deviated distance has just approached to the maximum operating range of the tracking actuator, thereby moving the optical pickup 2 toward the optical axis.

The servo unit 6 creates control input for the DC sled motor 11 based on the nominal model of the sled motor 11. The characteristics of the sled motor 11, however, may change as the operating environment such as temperature varies. If so, the required control accuracy for the sled motor 11 may not be attainable, although the servo unit 6 works as designed. In this case, the objective lens is not positioned around the optical axis as shown in FIG. 2, which implies that the operating range of the tracking actuator cannot be fully utilized or may result in tracking failure in the worst case.

SUMMARY OF THE INVENTION

It is an object of the present invention to provide a method and apparatus for servo control of an optical disk recording/reproducing device, capable of maintaining the center of the object lens around the optical axis within a prescribed range.

A method for servo control of an optical disk reproducing/recording device in accordance with the present invention comprise the steps of detecting the distance between the center of an objective lens and an optical axis, examining whether the detected distance exceeds a prescribed range, and changing the magnitude of each drive signal by a microstep depending upon the examination result and applying the drive signals to a sled motor for moving an optical pickup containing the objective lens.

An apparatus for servo control of an optical disk reproducing/recording device in accordance with the present invention comprises detection means for detecting a signal indicative of the distance between the center of an objective lens and an optical axis, determination means for determining the direction to which the center of the objective lens deviates from the optical axis and the magnitude of the deviation, control means for changing the magnitude of each drive signal by a microstep depending upon the determination result and outputting the drive signals, and drive means for driving a sled motor for moving an optical pickup containing the objective lens in response to the drive signals.

In the present invention, the distance between the center of the objective lens and the optical axis is estimated while reproduction of recorded data is performed. If the estimated distance exceeds a predetermined range, drive pulses are applied to the stepping motor, thereby moving the optical pickup in such a way that the distance decreases.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
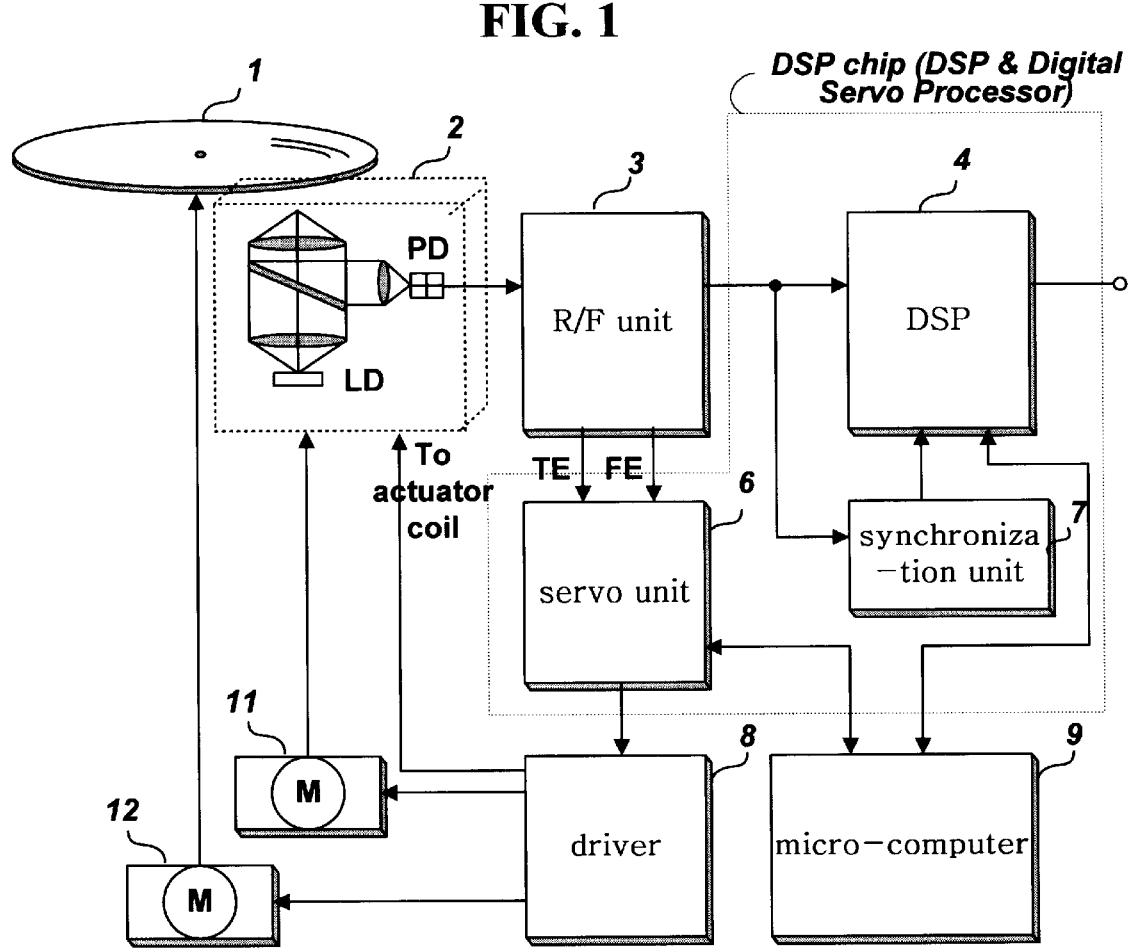
FIG. 1 is a block diagram of a general optical disk reproducing apparatus.
Figure 2:
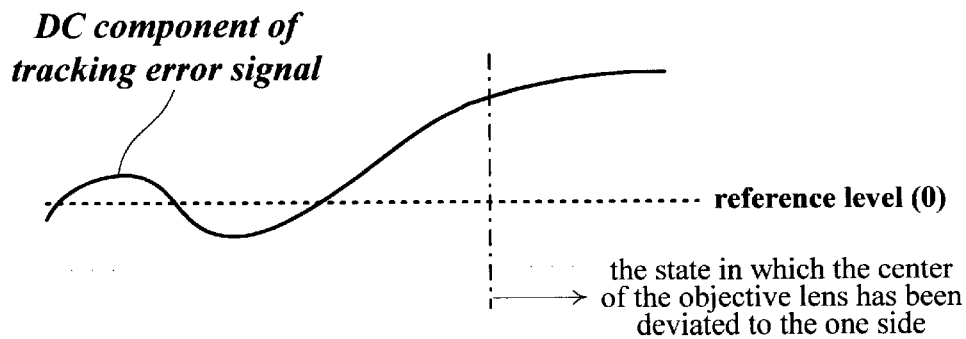
FIG. 2 is a pictorial view of a DC component of servo error signal representing a center error of an objective lens.
Figure 3:
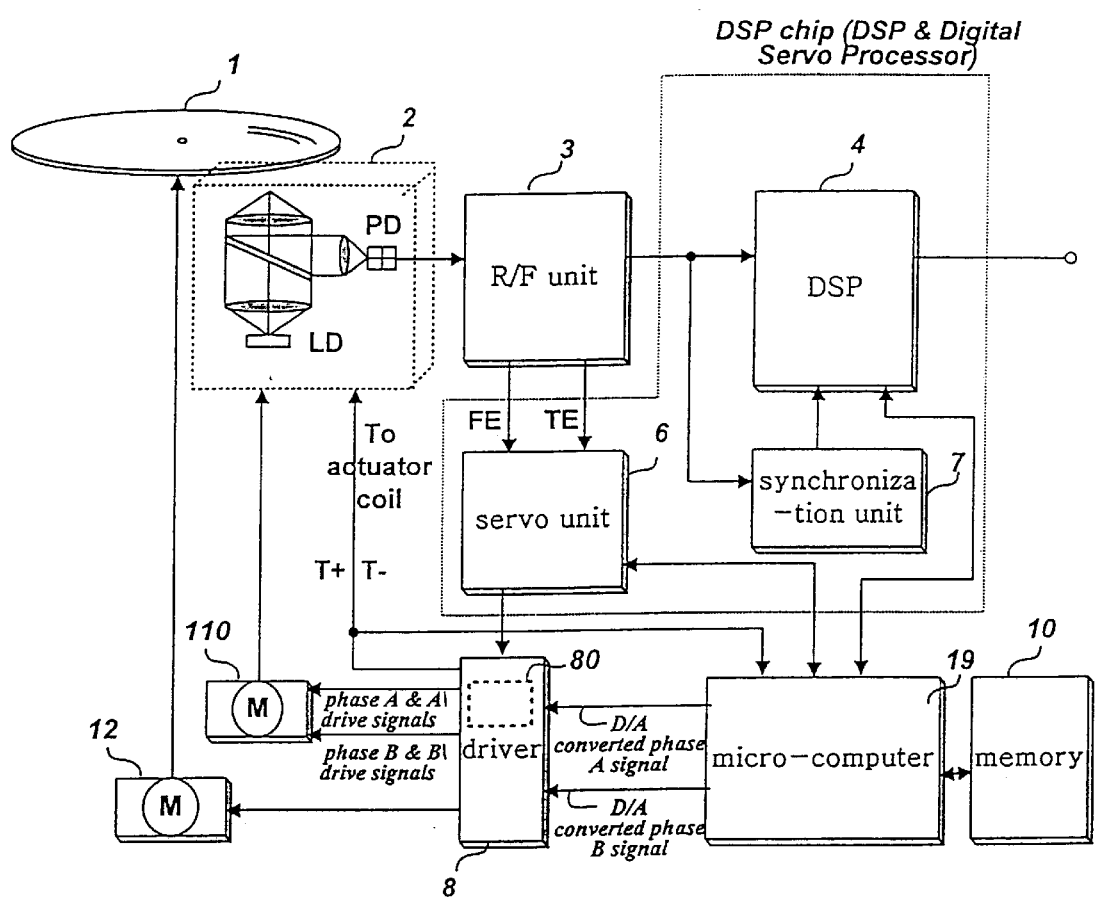
FIG. 3 is a block diagram of an optical disk reproducing/recording apparatus embodying the present invention.

FIG. 3 is an optical disk reproducing/recording device in which the present invention may be advantageously practiced. The DC sled motor 11 shown in FIG. 1 is replaced with a 2-phase stepping motor 110 and a drive 8 contains a stepping motor drive unit 80 which outputs drive pulses for the stepping motor 110. A microcomputer 19 digitizes T+ and T− signals, which are applied to an actuating coil from the driver 8, and executes an interrupt service routine for controlling the position of the optical pickup 2 using the digitized T+ and T− at intervals of T. A memory 10 is used to store any data and/or program for the microcomputer 19.

Figure 4A:
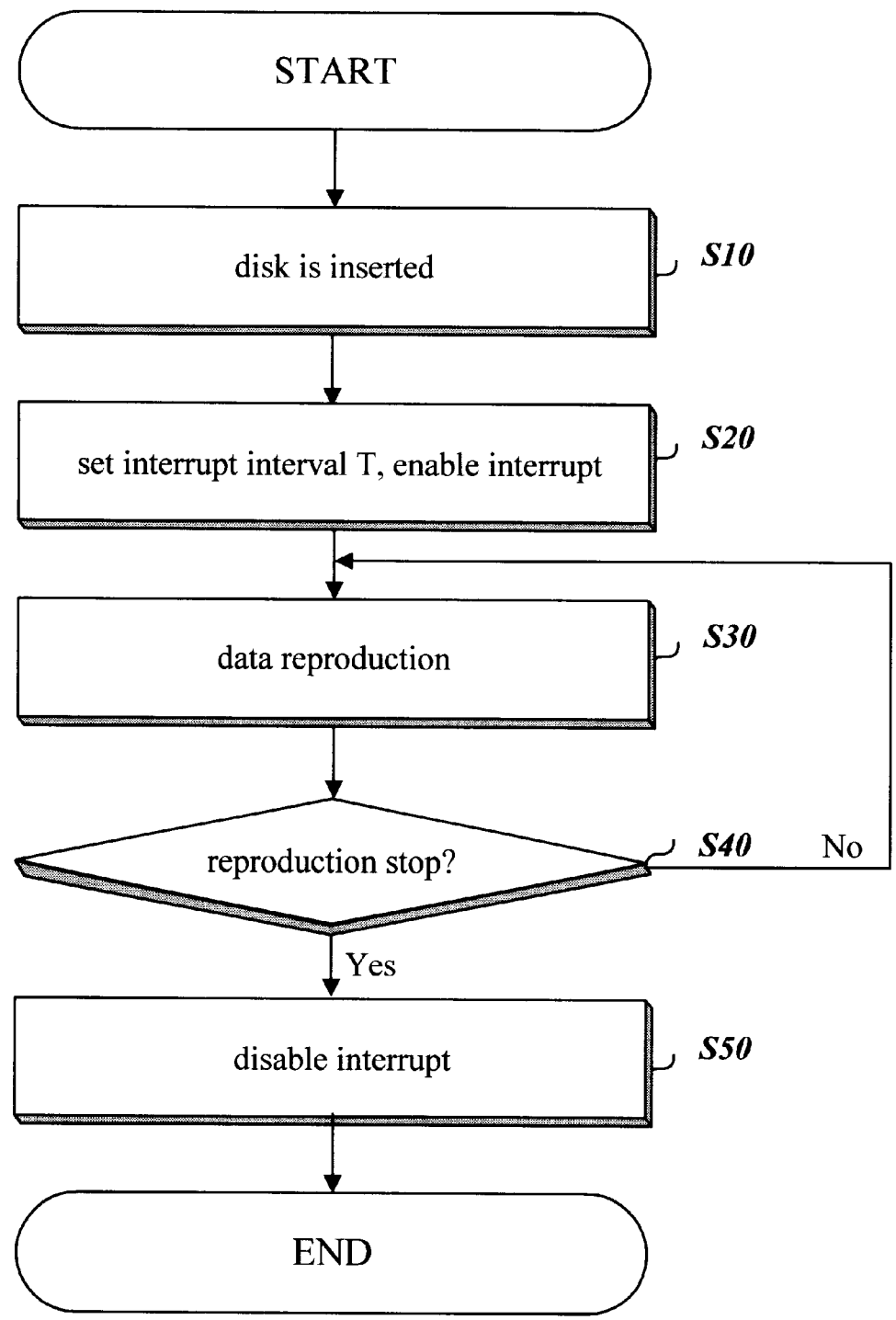
FIG. 4A is a flow diagram for reproducing data from an optical disk according to an embodiment of the present invention.
Figure 4B:
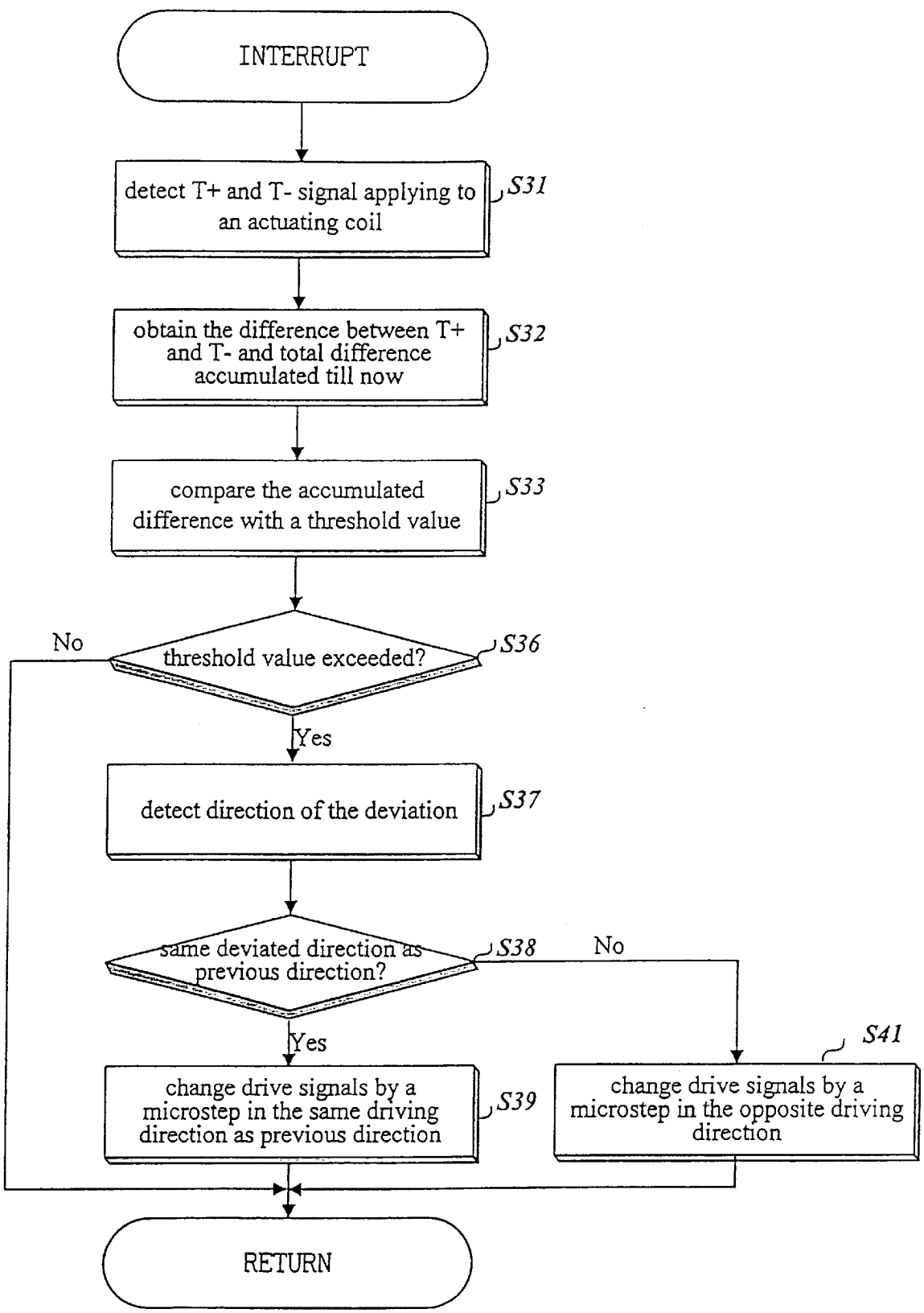
FIG. 4B is a flow diagram of the interrupt service routine of the method in accordance with the present invention.

The method for servo control of an optical disk reproducing/recording device in accordance with an embodiment of the present invention will be explained with reference to FIG. 3 and FIGS. 4A and 4B.

If an optical disk 1 is inserted (S10), the microcomputer 19 sets an interrupt interval T and enables an interrupt for controlling the sled motor 110 (S20). Subsequently, driven by a driver 8 a spindle motor 12 starts to rotate at a given speed. The stepping motor drive unit 80 beings to output four pulse trains of A, B, A\, and B\-phase driving signals, wherein A and B phases are 90° different from each other and A\ and B\ phases are 180° different from A and B phases, respectively. The rotation speed and direction of the stepping motor 110 can be controlled by changing the phases and amplitude of the two excitation phases. The stepping motor 110 moves the optical pickup 2 to a predetermined initial position (S30) to perform a data reproduction.

While reproducing recorded data from the optical disk 1. The microcomputer 19 executes the interrupt service routine for controlling the position of the optical pickup 2 at intervals of T.

Figure 6:
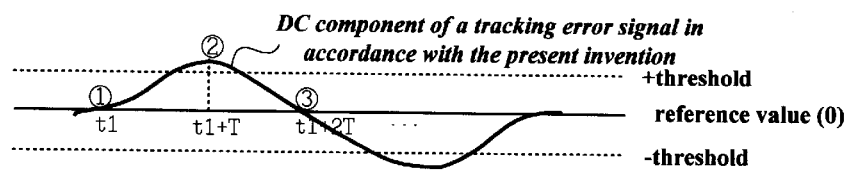
FIG. 6 is a pictorial view of a DC component of servo error signal representing a center error of an objective lens in accordance with the present invention.

Upon entering the interrupt service routine, the microcomputer 19 digitizes the T+ and T− signals outputted from the driver 9 (S31) and obtains the difference value between the T+ and T− signals. Then, the microcomputer 19 adds the obtained difference value to a total difference accumulated till then and estimates the distance between the center of the objective lens and the optical axis from the accumulated difference (S32). The microcomputer 19 checks whether the deviation remains within a threshold range shown in FIG. 6. (S33). If it is confirmed that the deviation exceeds threshold range (S36), the microcomputer 19 checks the direction to which the object lens has deviated from the optical axis based upon whether the accumulated difference is positive or negative (S37).

Figure 5:
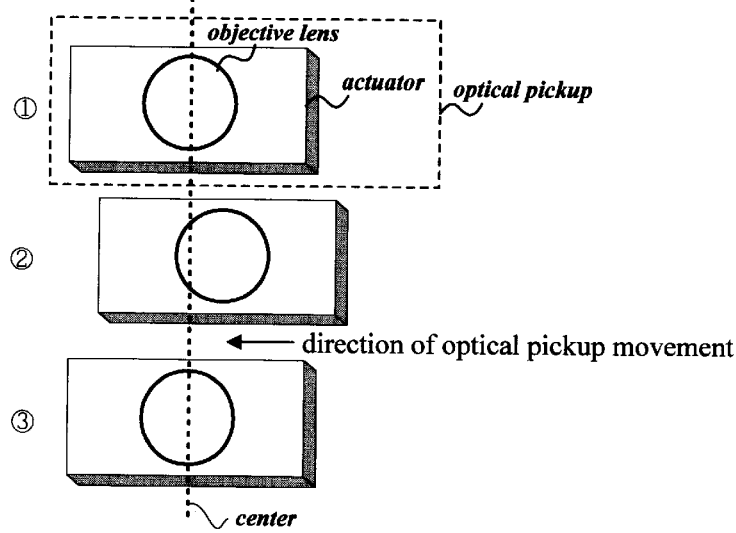
FIG. 5 is a pictorial view of the position of the objective lens controlled by the method in accordance with the present invention.
Figure 7:
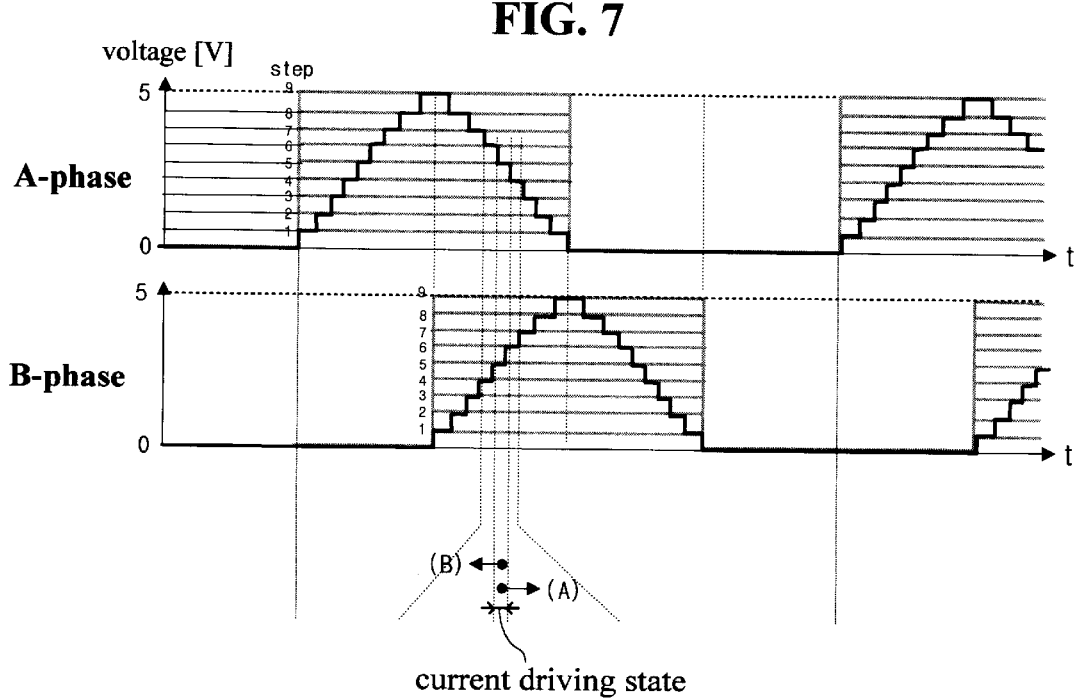
FIG. 7 is a pictorial view of an example of drive signals to be applied to a 2-phase stepping motor for moving an optical pickup according to an embodiment of the present invention.

If the deviated direction detected at present is the same as the deviated direction detected in the previous execution of the interrupt service routine, the microcomputer 19 changes excitation phases A and B as shown in FIG. 7 so that the stepping motor 110 rotates by a microstep in the same direction as in the previous microstep rotation (S38). For example in FIG. 7, the magnitude of the excitation phase A decreases by a microstep, while the magnitude of the excitation phase B increases by a microstep so that the optical pickup 2 moves in such a way that the center of the objective lens moves from the current position ② in FIGS. 5 and 6 toward the optical axis.

In this embodiment, it is assumed that rotating the stepping motor 110 by a macrostep makes the optical pickup 2 move by 144 tracks and a macrostep pulse is divided into 9 microstep levels. Hence, the distance due to a microstep rotation amounts to 16 tracks.

While the optical pickup 2 moves by the drive pules given by the microcomputer 19, the servo unit 6 continues control of the tracking actuator so that the laser beam is positioned on a target track within an allowable error.

If the direction of the deviation confirmed in step S37 is opposite to the direction of the previous stepping motor rotation, the microcomputer 19 outputs excitation phase A and B pulses so that the stepping motor rotates by a microstep in the opposite direction (S41). For example in FIG. 7, the magnitude of each of the excitation phase A and B changes by a microstep in the direction of (B) so that the optical pickup 2 moves in such a way that the center of the objective lens moves from the current position 2 in FIGS. 5 and 6 toward the optical axis as shown in 3 of FIG. 5. After conducting the procedure, the microcomputer 19 finishes the interrupt service routine. If the deviation remains within the prescribed range in step S36, the microcomputer 19 finishes the interrupt service routine without changing the excitation phases A and B.

The position control of the optical pickup 2 is performed at intervals of T by the interrupt service routine (S31~S39 and S41) while the recorded data is reproduced from the optical pickup 2. When the data readout mode finishes (S40), the interrupt service routine is disabled (S50).

In the present invention, a stepping motor is used as the sled motor for moving the optical pickup. Since the stepping motor is precisely controllable by drive pulses, stable tracking capability is attainable even in the case where operating environment such as temperature changes. In addition, the employment of the stepping motor makes the slide structure simple and enables a pickup sliding control through a control program instead of a hardware such as a DSP chip for normal playback.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for servo control of an optical disk reproducing/recording device, comprising the steps of:

(a) detecting a distance between the center of an objective lens and an optical axis, wherein the distance is obtained by accumulating an operating signal that is used to operate an actuator relative to a current position of the objective lens;

(b) checking whether the detected distance exceeds a predetermined range; and (c) changing the magnitude of a drive signal by a microstep depending upon the check result and applying the drive signal to a sled motor for moving an optical pickup containing the objective lens, wherein the operating signal includes T+ and T− signals applied to an actuating coil and in said step (a), the distance is obtained by accumulating difference values between the T+ and T− signals.

2. The method set forth in claim 1, wherein the drive signal is a 4-phase signal and the level of the drive signal increases or decreases by a microstep.

3. The method set forth in claim 1, wherein said step (b) detects the direction to which the center of the objective lens deviates from the optical axis and said step (c) outputs the drive signal for moving the optical pickup in the detected direction to reduce the detected distance.

4. The method set forth in claim 1, wherein said microstep is less than an allowable maximum amplitude of the drive signal.

5. The method set forth in claim 1, wherein a direction of the operating signal is further detected with the distance and the distance is obtained by accumulating the operating signal depending on the direction of the operating signal.

6. An apparatus for servo control of an optical disk reproducing/recording device, comprising:

- a detection unit detecting a distance between the center of an objective lens and an optical axis, wherein the distance is obtained by accumulating difference values between T+ and T− signals applied to an actuating coil to operate an actuator relative to a current position of the objective lens;
- a control unit checking whether the detected distance exceeds a predetermined range and outputting a drive signal as a micro-step depending upon the checking result; and
- a drive unit driving a sled motor to move an optical pickup containing the objective lens in response to the drive signal.

7. The apparatus set forth in claim 6, wherein said microstep is less than an allowable maximum amplitude of the drive signal.

8. The apparatus set forth in claim 6, wherein the T+ and T− function as an operating signal for the actuator, and a direction of the operating signal is further detected with the distance by the detection unit, and the distance is obtained by accumulating the operating signal on the direction of the operating signal.

\* \* \* \* \*